Patented Dec. 24, 1946

2,412,942

UNITED STATES PATENT OFFICE 2,412,942

METHOD OF FORMING RUBBER AMINES

Frederick C. Bersworth, Verona, N. J.

No Drawing. Application July 31, 1942,
Serial No. 453,111

8 Claims. (Cl. 260—768)

This invention relates to chemistry and more particularly to organic chemistry and to the chemistry of rubber.

One of the objects of the present invention is to provide a method of forming rubber-amines.

Another object is to provide rubber-amine compounds that are utilizable in the art as toughening agents in rubber.

Still another object is to provide a commercially practical method of converting rubber into rubber-amine compounds.

Other objects will be apparent as the invention is more fully hereinafter disclosed.

This application is an improvement of the invention described and claimed in my co-pending application Serial No. 420,101, filed November 22, 1941, now issued as Patent No. 2,364,186, dated December 5, 1944, and is a continuation-in-part application of my co-pending application Serial No. 284,216, filed July 13, 1939, now issued as Patent No. 2,294,442, dated September 1, 1942.

In accordance with these objects I have discovered that the long chain-high molecular weight rubber molecule which consists of a plurality of $C_5H_8$ groups linked together by double bonded carbons ($C=C$) may be broken up into shorter chain length aminated $C_5H_8$ groups by bringing the rubber molecule into reactive contact with an aliphatic amine in the presence of a hydrogenating catalyst at the hydrogen activation temperature of the catalyst under conditions inhibiting oxidation and hydrolysis.

I have found, as heretofore described in my co-pending application Serial No. 284,216 above identified, that an aliphatic amine which contains at least one amino group having at least one displaceable amino hydrogen, may be activated by a hydrogenating catalyst to such an extent as to become chemically reactive at the displaceable amino hydrogen particularly towards double bonded carbon groups, saturating the double bonds of the group with hydrogen and imino residues, forming thereby aminated compounds.

When this general reaction is applied to rubber, I find that a plurality of rubber-amine compounds may be prepared depending upon the amine employed, the relative proportions of the amine to rubber used, the temperature of the reaction and the time.

To enable one skilled in the art to understand and to practice the present invention, the basic theory on which the present invention is predicated will be described.

In accord with modern theory, the rubber molecule is considered to be made up of a large number of $C_5H_8$ groups linked together in a regular manner, the total number of such groups and the particular manner of linkage, at present being undetermined. However, it is well recognized that each $C_5H_8$ group contains one double bonded carbon and the structural formula that has been most generally accepted for the group is as follows:

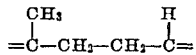

The plurality of $C_5H_8$ groups are believed to be linked together in the following manner:

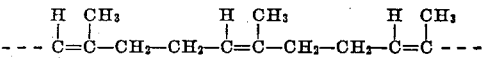

In accordance with the present invention the double bonded carbons of the group

are saturated with H and

groups, respectively, derived from an aliphatic amine conforming to the formula

wherein R=at least one aliphatic carbon group and R′=hydrogen or a group substituted for said hydrogen. The saturation of the double bonded carbons is brought about by bringing the rubber molecule into reactive contact with the amine in the presence of a hydrogenating catalyst at the hydrogen activating temperature of the said catalyst preventing oxidation and hydrolysis during the reaction.

In this reaction, the long chain rubber molecule is split at the point of saturation with the formation of the following type compounds where R·NHR′ equals a simple amine having but one NH₂ group, such as ethylamine—(CH₃·CH₂·NH₂)

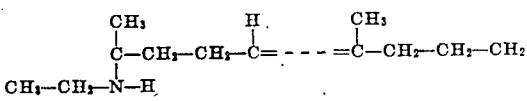

When the long chain rubber molecule becomes completely aminated, compounds of the following type will be obtained from such a simple amine:

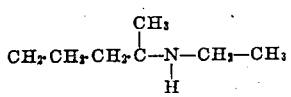

Where the amine R·NHR′ contains two activatable amino groups, such as ethylene diamine (NH₂·CH₂·CH₂·NH₂), the long chain rubber molecule is split into aminated compounds of the following type:

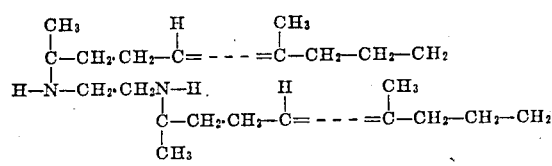

The particular length of C₅H₈ groups between the aminated end groups of the compound may vary widely, depending upon the relative proportion of amine to rubber and the temperature of reaction. As an ultimate end product, however, it is possible to form as a final product a product conforming to the following:

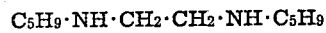

When amines containing poly amino groups are employed, the type and kind of amino compounds formed becomes exceedingly complex, as one skilled in the art may perceive, and as the molecular weight of the aliphatic amine increases the molecular weight of the rubber amine compound increases. It is believed apparent, therefore, that a large number of rubber amine compounds may be made in accordance with the method of the present invention, and as it is impossible to describe them all, the following examples of the practice of the present invention are given for purposes of illustration and are not to be considered as limiting on the scope of the present invention.

*Example I*

Rubber-amines derived from ethylene diamine.

Finely ground or mechanically fragmented rubber is suspended in anhydrous ethylene diamine and from 5 to 10% of the weight of the rubber of a hydrogen activating nickel catalyst is added to the suspension. The suspension is placed in a container sealed from the atmosphere, but provided with a refluxing condenser, and is heated to the boiling point of ethylene diamine (approximately 116–117° C.) for an extended time interval approximating 4 to 6 hours, or until the rubber particles have been substantially completely dissolved in the diamine.

As hereinabove indicated the relative proportion of the diamine to the rubber may vary widely without departure from the present invention, the effect of the increase in diamine being to reduce the total number of C₅H₈ groups included within the aminated end groups thereby changing the molecular weight of the rubber amine. In the specific embodiment given, I prefer to employ about 10 to 15 parts ethylene diamine to each part of rubber. This ratio of amine to rubber produces a rubber-amine which, after the excess amine has been removed therefrom by distillation and the insolubles contained therein have been removed by filtration, is a free flowing liquid at temperatures above about 80° C. and a jelly at atmospheric temperature, and which has a boiling point considerably above the temperature of reaction (116–117° C.). With this relative proportioning of amine to rubber, the rubber amine product has a pH in the neighborhood of 10.5 indicating that both amino groups of the diamines have been reacted with the rubber. The rubber-amine is miscible with or soluble in water and is undecomposed by acids and alkalis, and is admirably well suited for use as a toughening agent in rubber.

The rubber-amine product of the present invention may be subjected to vacuum distillation to obtain a constant composition rubber-amine compound, if desired, and by subjecting the vapors of the rubber-amine to "cracking" various de-aggregation compounds may be formed therefrom. The constant composition rubber-amine compound and the de-aggregated compounds thereof offer wide possibilities in organic synthesis reactions generally.

The constant composition rubber-amine compound may be further aminated by reacting the compound with an amine in the presence of a hydrogenating catalyst in the same manner as hereinabove described, and by the use of another amine in the second amination reaction a different series of rubber-amine compounds may be formed.

Other suitable catalysts may be employed in place of the nickel, such as copper-chromite, platinum and palladium black. The nickel, however, appears best suited for most of the temperature conditions covering the ranges of boiling points of most aliphatic amines.

It is believed apparent from the above disclosure that any aliphatic amine may be substituted for ethylene diamine to obtain an analogous series of reaction products in the reaction of the specific embodiment. The only limitation that appears is the aliphatic amine must contain at least one amino group containing at least one displaceable amino hydrogen. Accordingly, the term "amine" insofar as it relates to substantial equivalents for ethylene diamine in the specific embodiment disclosed must be construed to mean any aliphatic amine that contains at least one reactive amino group containing at least one displaceable amino-hydrogen. Such a definition of amines includes any amine conforming to the generic structural formula

wherein R=at least one aliphatic carbon group and R′=hydrogen or any group substituted for said hydrogen.

As the complexity of the aliphatic amine structure increases the complexity of the rubber-amino compound that may be formed increases, as one skilled in the art will readily perceive, and the properties of the rubber-amino compound obtained varies with variation in the amine reacted therewith as would be expected.

Due to the difficulty in obtaining anhydrous amines for reaction with the rubber, it is preferable to employ amines such as tri-ethylene tetraamine or di-ethylene triamine in place of the ethylene diamine given in the specific embodiment. With such di- and poly-amines, various polymers and branched structure compounds of the rubber-amino compound are formed. This is due in part to the higher boiling point of the amine which results in the more complete activation of the amino hydrogen and the greater ease with which the long chain rubber molecules is split up into smaller fragments, and in part to the fact that where more than two reactive amino groups are present in one amine molecule, the excess amino groups being activated are available for reaction with the double bonded carbons in the rubber molecule. Also in many instances, the second amino hydrogen will become activated and enter into combination with the rubber molecule.

In general, the polymeric rubber-amino compounds thus produced may be broken down into more simple and constant composition rubber amine compounds by high vacuum distillation or by the use of high vacuum distillation in combination with cracking, such as for example by passing the polymeric vapors over a neoprene lamp and condensing the resultant vapors.

The thus produced rubber-amine compounds are, in general, unsaturated compounds and may be further aminated, re-polymerized or may be employed as co-polymers with other compounds.

With diethylene triamine, for example, the type of rubber-amine compounds that are obtained using from 7 to 10% amine based on the rubber weight, appear to be of exceeding utility in the art as toughening agents. In general, as the number of amino groups increases and the molecular weight of the amine increases the amount of the amine required to break up the rubber into useful rubber-amine compounds may be markedly reduced from the 10 to 1 ratio of the specific embodiment to 5 to 10% of the weight of the rubber.

In the practice of the present invention employing scrap rubber as a source of the rubber compounds, the presence of sulfur, talc, metal oxides, carbon black and other inert filler material, does not appear to be detrimental to the basic reaction on which the invention is predicated. However, I have found that it is preferable, prior to the practice of the present invention, to subject the rubber-amine suspension to extended ball milling prior to heating the same to the reaction temperature, thereby to form a substantially colloidal dispersion of the rubber molecules in the amine. This procedure affords a means of materially shortening the time interval required to complete the reaction, thereby eliminating the problem of mechanical obstruction incident to the presence of the talc, metal oxides, etc., to the progress of the reaction.

In general, it will be found that the rubber-sulfur compounds present in scrap rubber aminate substantially in the same way as does the pure rubber, with the sulfur remaining attached to the aminated $C_5H_8$ groups contained in the rubber-amine. These rubber-amine-sulfur compounds are equally as useful as the rubber-amine compounds, producing tackiness in rubber mixtures.

Having hereinabove described the present invention generically and given one specific embodiment of the same with several modifications thereof, it is believed apparent that the same may be widely varied without essential departure therefrom and all such modifications and adaptations are contemplated as may fall within the scope of the following claims.

What I claim is:

1. The method of forming rubber-amino compounds which comprises forming a suspension of rubber in substantially anhydrous ethylene diamine containing 10 parts diamine to each part of rubber by weight, and heating the said suspension in the presence of a hydrogenating catalyst active as a hydrogen activating catalyst, said catalyst being one selected from the group consisting of nickel, copper-chromite, platinum black and palladium black, at the boiling point of ethylene diamine to the said boiling point of the diamine in a container from which air and water vapor is excluded, the time interval of heating being extended to that effective to substantially completely dissolve the said rubber in the said diamine.

2. The method of claim 1, wherein after filtering off the insolubles present in the solution and removing any excess amine present therein, the remaining solution is subjected to vacuum distillation at a substantially constant temperature and pressure to obtain a constant composition rubber-amino product therefrom.

3. The method of claim 1, wherein after filtering off the insolubles present in the solution and removing any excess amine present therein, the remaining solution is subjected to vacuum distillation at a substantially constant temperature and pressure to obtain a constant composition rubber-amino product therefrom, and wherein prior to condensation of said constant composition product the vapors thereof are subjected to cracking to break down the polymeric structures therein.

4. The method of claim 1, wherein said suspension comprises a substantially colloidal suspension of the rubber in the amine.

5. The method of forming rubber amine compounds which comprises suspending the rubber in finely divided form in anhydrous ethylene diamine, adding thereto from 5 to 10% of the weight of the rubber of a hydrogen-activating nickel catalyst and heating the suspension to a temperature approximating the boiling point of the diamine for an extended time interval in a container open to the atmosphere through a reflux condenser.

6. The method of claim 5, wherein the relative proportion of rubber to amine is within the range 10 to 15 parts amine to each part of rubber, and wherein the time interval of heating is within the range 4 to 6 hours, and wherein rubber amine compounds having a pH in aqueous solution of about 10.5 are formed.

7. The method of forming rubber-amino compounds which comprises suspending one part rubber in from 10 to 15 parts substantially anhydrous ethylene diamine and heating the suspension in the presence of a hydrogen-activating catalyst consisting of nickel to a temperature approximating the boiling point of the diamine under conditions excluding oxidation and hydrolysis.

8. The method of forming rubber-amine compounds, which comprises suspending the rubber in an anhydrous aliphatic amine having at least one amino nitrogen group therein having at least one displaceable amino hydrogen contained therein, and heating the suspension to a temperature approximating the boiling point of the amine in the presence of a hydrogen activating catalyst under conditions excluding oxidation and hydrolysis, the relative amounts of the rubber to the amine being apportioned with respect to the number of said amino nitrogen groups present in the amine to provide a large excess of the amine over that required to obtain during said heating a breaking down of the long-chain rubber molecule into shorter chain length rubber molecules combined with said amine as rubber-amine compounds and approximating from 5 to 15% amine based on the weight of the rubber, with the amount of the hydrogen-activating catalyst present approximating 5 to 10% of the weight of the rubber and said catalyst being selected from the group of catalysts consisting of nickel, copper-chromite, and platinum and palladium black.

FREDERICK C. BERSWORTH.